United States Patent Office 2,949,197
Patented Aug. 16, 1960

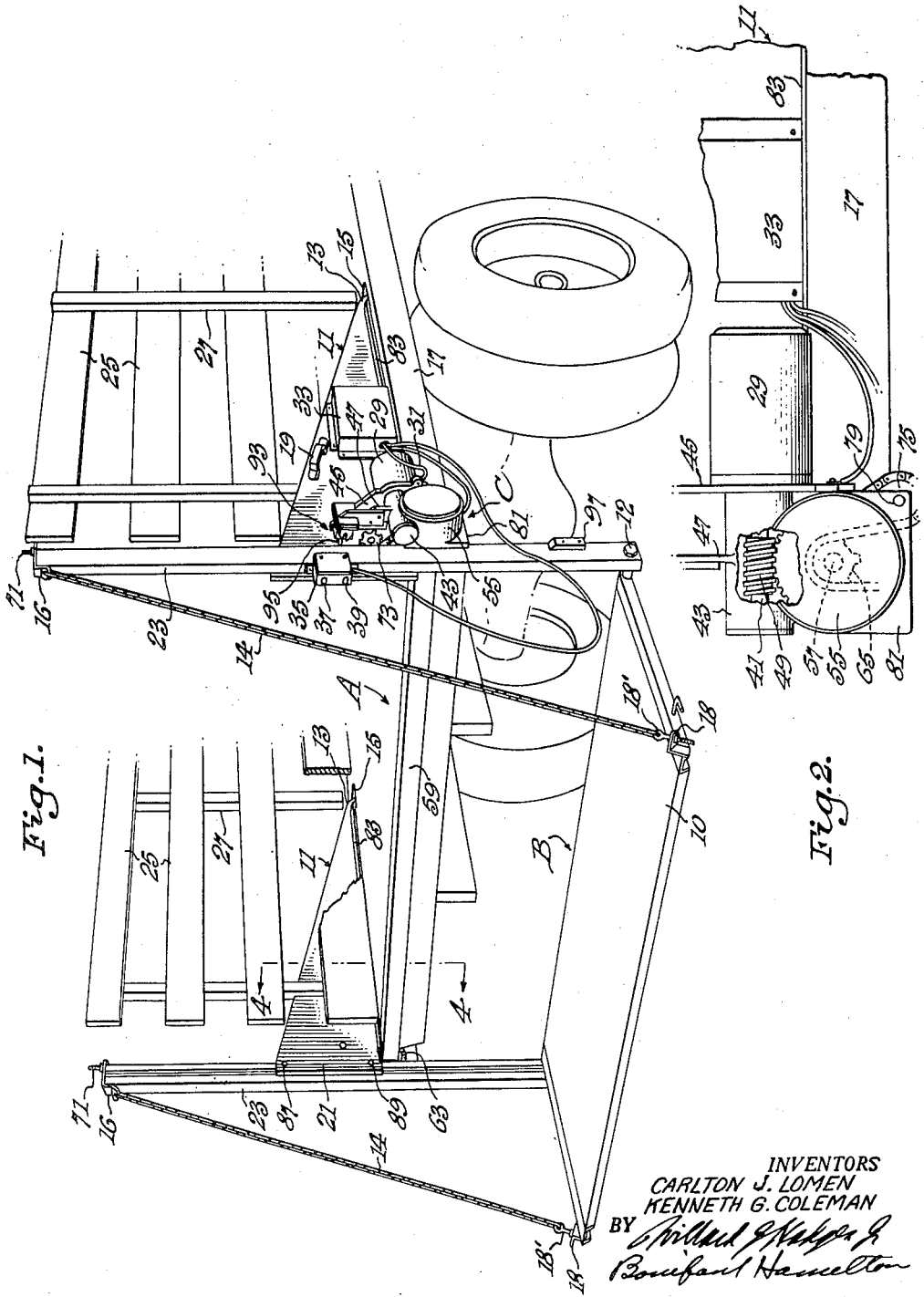

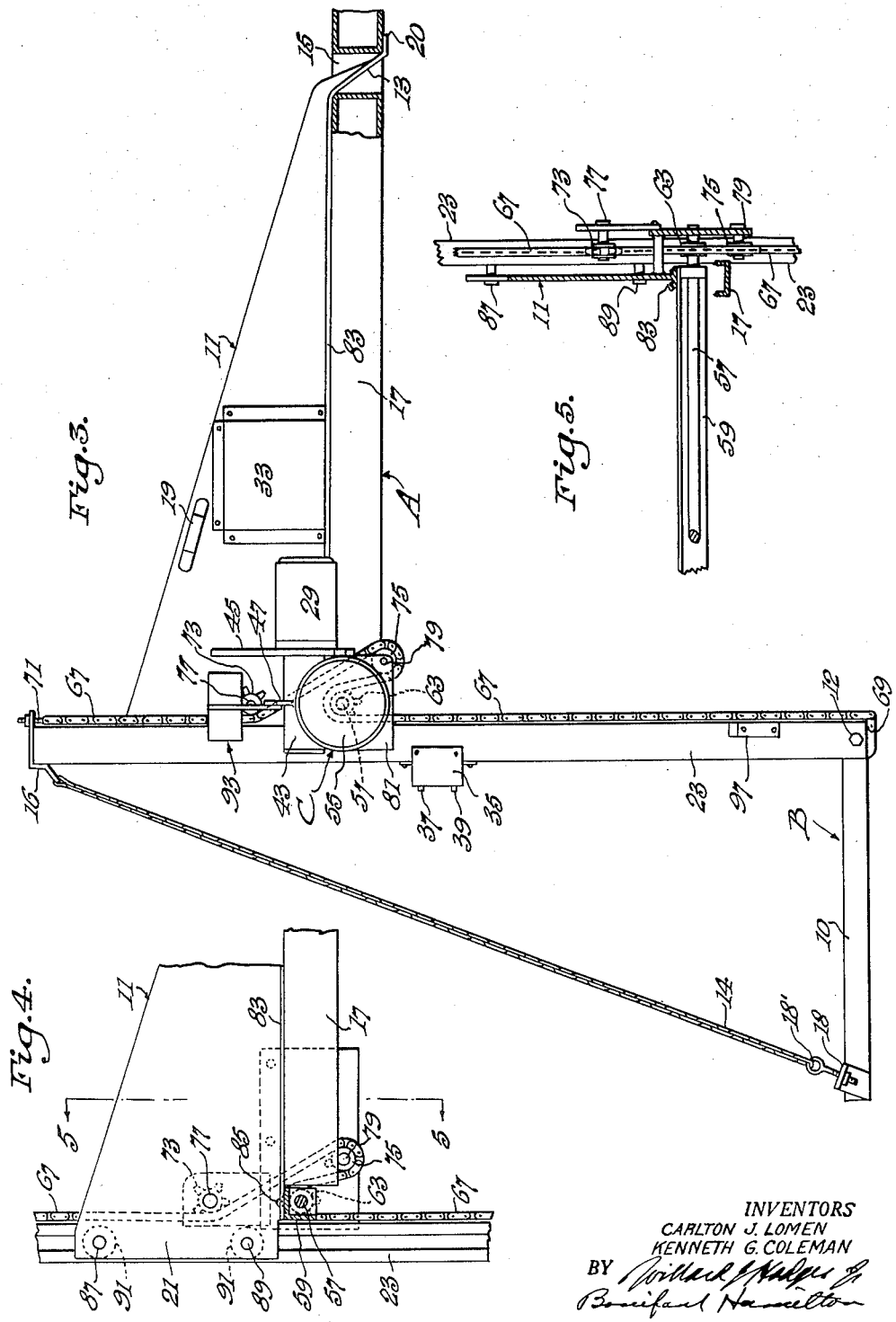

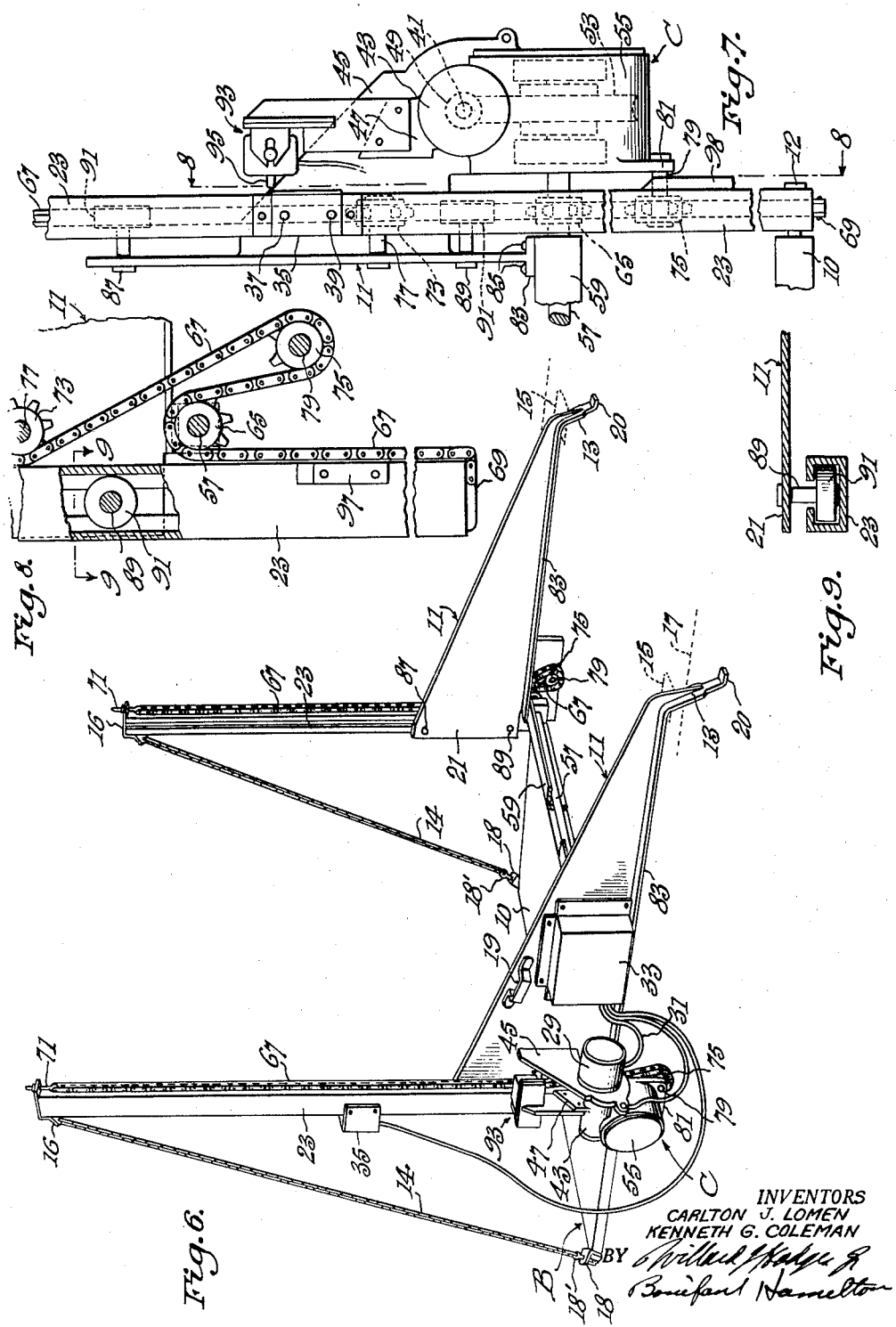

2,949,197

DEMOUNTABLE TAIL GATE ELEVATOR

Carlton J. Lomen, Herlong, and Kenneth G. Coleman, San Rafael, Calif.

Filed Apr. 14, 1958, Ser. No. 728,500

2 Claims. (Cl. 214—75)

(Granted under Title 35, U.S. Code (1952), sec. 266)

The invention described herein may be manufactured and used by or for the Government for governmental purposes without the payment of any royalty thereon.

In accordance with the present invention, there are provided certain improvements of equipment employed for raising and lowering tail gates of trucks and similar vehicles. More particularly, the invention provides improvements in tail gate elevator mechanism which employs conventional units but which are assembled in a novel manner, and which, when assembled, are not attached to the vehicle itself, but demountably rest on the bed or platform of the truck and which require no modification of existing units of equipment. The mounting and removing of the equipment can be accomplished by a single operator.

Prior to employment of the improved construction of the instant invention, it frequently has been necessary to move fork lift trucks to the loading station with a materials handling equipment transporter and later to move to the unloading station with the same equipment. This operation requires the use of two additional pieces of equipment, as well as two additional operators, whereas with the improved equipment of the instant invention a single operator accomplishes the loading, movement, and unloading.

Further objects and advantages of the present improved construction will become apparent as the description proceeds and the features of novelty will be pointed out in particularity in the appended claims.

The improved construction of the present invention will be understood more readily by reference to the accompanying drawings, in which—

Fig. 1 is a perspective view of the improved tail gate elevating equipment of the present invention operatively mounted on a truck or similar transportation vehicle;

Fig. 2 is a fragmentary side view, parts being broken away, illustrating details of portions of the driving instrumentalities for the operatively assembled equipment shown in Fig. 1;

Fig. 3 is an enlarged side elevation, partly in section, of the improved equipment, the view showing details of the manner of mounting the equipment on side bars of a conventional truck chassis;

Fig. 4 is a vertical section taken on the line 4—4 of Fig. 1, looking in the direction of the arrows;

Fig. 5 is a further vertical section, taken on the line 5—5 of Fig. 4, looking in the direction of the arrows;

Fig. 6 is a perspective view of the improved construction showing it demounted from the vehicle, but indicating by dotted lines the manner of retention of mounting plates for the equipment on the bed of the vehicle;

Fig. 7 is a vertical end view of the driving instrumentalities, the view indicating the mounting and inter-relationship between elements of the driving instrumentalities;

Fig. 8 is a vertical section of the instrumentalities of Fig. 7, taken on the line 8—8 of Fig. 7, looking in the direction of the arrows, parts being broken away to show structural details of the equipment; and Fig. 9 is a horizontal view along the section line 9—9 of Fig. 8, looking in the direction of the arrows.

Referring more particularly to the drawings, it will be seen that the improved mechanism of the instant invention is intended to be mounted on a vehicle such as a truck having a flat bed or platform A from which is elevationally suspended a tail gate structure B and elevating mechanism C therefor. This tail gate structure comprises a tail gate 10 pivotally mounted by pivot pins 12 to bottom portions of vertically disposed lifting channel members which will be referred to hereinafter, which channel members are disposed laterally vertically on each side of the flat bed A of the truck at the open end thereof, the tail gate 10 being suspended by chains or flexible cables 14 which are secured to brackets 16 on the top ends of the lifting channel members and which cables are attached to opposite outer free corners of the tail gate 10 by brackets 18 and eye bolts 18' secured in the brackets 18.

The elevator mechanism C comprises generally triangular side plates 11 mounted uprightly on each side of the vehicle body adjacent to the open end of the flat bed A of the vehicle, the side plates 11 being shown as being right-angled triangular plates having corresponding corners formed into approximately Z-shaped retaining flanges or hooks 13 which are insertable into openings 15 provided in lateral chassis beams 17, these openings 15 being conveniently stake holes when the vehicle is a truck having a stake body, or which may be provided therefor where the truck body is a type other than a stake body. The retaining flanges or hooks 13 engage the sides of the openings 15, the end flanges 20 thereof engaging the underside of the chassis beams 17, and hold the plates 11 in upright position; and as the plates 11 are intended to be manipulated manually, they are provided with hand grip brackets 19 for enabling an operator to remove and replace the plates as desired.

These plates 11 are formed so that a side 21 thereof is a mounting for guide means for vertical movements of the above-referred to lifting channels, which are preferably channel beams, and which are designated as channels 23, and which are moved vertically in a manner which will be described in detail hereinafter.

The drawings illustrate a truck vehicle having a stake body, the side bars 25 of which are maintained in properly spaced relation by stakes 27, the last two of which (or more if need be) having their bottom portions requisitely grooved or recessed for receiving the triangular side plates 11.

The vertically movable channel beams 23 constitute as aforesaid the means for vertically moving the tail gate 10 between its lowermost position as shown and a raised position even and level with the platform A of the vehicle. For accomplishing the desired vertical movement of the channel beams 23 and the tail gate 10, driving instrumentalities are provided which are carried on one (the proximate) of the side plates 11.

The driving instrumentalities for vertically moving the channel beams 23, which may be referred to also as elevator beams, include a motor 29, which is operated by current supplied by the battery of the vehicle through suitable conductor leads 31 and suitable relay controls contained in control box 33, such controls operating the motor 29 responsively to actuation of starting and reversal switch mechanism in a second control box 35 mounted on one (for example, the proximate) of the vertically movable elevator channel beams 23, such start and reverse switches in the second control box 35 being operated responsively to manual pressure exerted by an operator on switch-actuating contact buttons 37 and 39 on the control box 35, as will be referred to further hereinafter.

The motor 29 has its shaft 41 enclosed in a housing 43. The motor 29 is shown as being mounted on a bracket plate 45 that is welded or otherwise firmly secured to the proximate side plate 11 and projects perpendicularly outwardly therefrom. This bracket plate 45 also carries the housing 43 for the motor shaft 41.

This motor shaft 41 terminates in a worm drive 49 which is enclosed in the housing 43, the worm drive 49 meshing with a worm gear 53 that is housed in a housing 55. The worm gear 53 is mounted on the proximate end of a shaft 57 which extends across the vehicle platform A, and is positioned within an angle beam guard 59, which also extends entirely across the flat truck platform A.

The shaft 57 has mounted thereon, adjacent to its distal end, a sprocket 63 which in turn drives a series of sprockets to be referred to again hereinafter, for vertically moving the distal elevator beam 23. Also, the proximate end portion of the transverse shaft 57 has mounted thereon a driving sprocket 65 which is duplicative of the aforesaid sprocket 63 and functions in like manner. Thus, the proximate sprocket 65 is the drive sprocket for a proximate lifting sprocket chain 67 which is secured in a suitable manner as is indicated at 69 to the bottom end of the proximate elevator beam 23, the sprocket chain 67 being duplicated at the distal side. Each of the sprocket chains 67 is attached to an eye-bolt 71 at the top end of the respective elevator beams 23, and each sprocket chain 67 passes around corresponding idler sprockets 73 and 75 mounted respectively on axles 77 and 79, the latter of which is mounted in a bearing flange 81 extending from worm gear housing 55, the former of which is mounted in the proximate side plate 11.

It will be seen that each of the side plates 11 has a flanged bottom side, such being indicated at 83, such flanges 83 extending outwardly from both sides of the plates 11, each of which flanges being riveted or secured otherwise to the transverse angle bar 59, as is indicated at 85. Mounted in each of the plates 11 are stub shafts 87, 89, on which are mounted anti-friction rollers 91 which are positioned interiorly of the vetrically movable elevator beams 23, guiding the vertical movements of the latter.

Operationally, both proximate and distal elevator beams 23 are raised simultaneously and equally by an operator pressing a starting or "up" button 37 in the control switch box 35 on the proximate elevator beam 23, which starts the motor 29 to raise the beams 23, by action of the sprockets 63 and 65 on the transverse shaft 57. The elevator beams are actuated simultaneously and equally by the sprocket chains 67, there being provided a limit switch mechanism 93 carried by a bracket 47 extended upwardly from housing 43, the switch mechanism being operated by a trippable abutment arm 95 positioned adjacent to the proximate elevator beam 23, so that the abutment arm 95 is engageable with a cam-acting abutment member 97 mounted on the proximate elevator channel beam 23, the resultant tripping of the arm 95 of the limit switch stopping the operation of the motor 29 simultaneously with the tail gate 10 reaching the level of the vehicle platform A. The tail gate 10 then may be closed manually by the operator.

Retraction of the beams 23 is accomplished by reversing the operation of the motor 29 through circuits established by contactors or relays, not shown, in control box 33 by the operator pressing the switch button, or "down" button, 39 until the tail gate and associated parts reach their lowermost position, where the motor 29 stops, with the tail gate 10 and associated parts of the tail gate assembly B assuming their original position.

The individual units of electrical equipment employed in connection with the present invention are all standard parts, and consequently it is thought that detailed showings thereof and their circuit connections which are substantially the same as are employed conventionally in connection with meter reversing operations are not needed for completion of the instant disclosure, such being considered to be evident to one skilled in the art.

We claim:

1. Elevator mechanism for vertically moving a vehiclular tail gate between a position below a flat vehiclular platform and a position level therewith, comprising the combination with a vehicle chassis having opposite longitudinally extending side bars provided with corresponding openings extending substantially vertically therethrough, a pair of substantially right angled triangular side plates demountably carried uprightly edgeways upon upper surfaces of said side bars, each of said plates being disposed upon a corresponding long edge resting upon the side bars and having a retaining flange projecting from corresponding ends of the plates and extending into and through the openings in the side bars of the vehicle chassis and engaging bottom surfaces of the side bars adjacent to the openings for removably retaining the side plates in upright position on the side bars when in service, a pair of vertically movable elevator beams carried by said side plates and attached to opposite side portions of the tail gate, guide rollers in said elevator beams mounted on said side plates for guidance of said elevator beams during vertical movements of said elevator beams and tail gate, and operating mechanism for said elevator beams including a motor mounted upon a bracket plate extending perpendicularly from one of said side plates, a second bracket plate also extending perpendicularly from the side plate, a mechanical drive carried by said second bracket plate and mechanically coupled to said motor and flexible drive means interconnecting said elevator beams and said mechanical drive for operating said elevator beams and tail gate simultaneously and uniformly between the positions thereof.

2. Elevator mechanism for vertically moving vehicular tail gates as claimed in claim 1, wherein the side plates are substantially triangular in shape having a corresponding longer side engaging the side bars, the plates being mounted uprightly edgeways on the corresponding longer sides and the retaining flange projecting therefrom is substantially Z-shaped and extends from a corresponding corner of the plates through the openings in the side bars and interlocking with the bottom surfaces of the side bars for retaining the plates in upright edgeways position.

References Cited in the file of this patent

UNITED STATES PATENTS

| 2,236,317 | Howland | Mar. 25, 1941 |
| 2,277,529 | Richter | Mar. 24, 1942 |
| 2,382,299 | Deiters | Aug. 14, 1945 |
| 2,635,771 | Black | Apr. 21, 1953 |
| 2,698,103 | Rostine | Dec. 28, 1954 |

FOREIGN PATENTS

| 869,120 | Germany | Mar. 2, 1953 |